Sept. 8, 1970      R. E. SHIPLEY      3,526,971

METHOD AND APPARATUS FOR TESTING QUALITIES OF JUDGMENT

Filed Jan. 2, 1968      6 Sheets-Sheet 1

Fig. 1

INVENTOR
ROBERT E. SHIPLEY
BY
*Frask, Jenkins & Hanley*
ATTORNEYS

Sept. 8, 1970 R. E. SHIPLEY 3,526,971
METHOD AND APPARATUS FOR TESTING QUALITIES OF JUDGMENT
Filed Jan. 2, 1968 6 Sheets-Sheet 2

INVENTOR
ROBERT E. SHIPLEY
BY
*Trask, Jenkins & Hanley*
ATTORNEYS

Sept. 8, 1970      R. E. SHIPLEY      3,526,971
METHOD AND APPARATUS FOR TESTING QUALITIES OF JUDGMENT
Filed Jan. 2, 1968      6 Sheets-Sheet 4

Fig. 7

INVENTOR
ROBERT E. SHIPLEY
BY
*Trask, Jenkins*
*& Hanley*
ATTORNEYS

United States Patent Office 3,526,971
Patented Sept. 8, 1970

3,526,971
METHOD AND APPARATUS FOR TESTING QUALITIES OF JUDGMENT
Robert E. Shipley, Indianapolis, Ind., assignor to Eli Lilly and Company, Indianapolis, Ind., a corporation of Indiana
Filed Jan. 2, 1968, Ser. No. 695,041
Int. Cl. G09b 7/06
U.S. Cl. 35—9
31 Claims

ABSTRACT OF THE DISCLOSURE

A method and apparatus for determining the quality of a subject's judgment-making abilities by having him play a game in which he makes successive decisions based on progressively supplied information, requiring him to indicate a measure of his confidence of the correctness of each decision he makes, and evaluating his over- and under-confidence in making such decisions.

The subject successively depresses selected play buttons on a 7 x 7 array of buttons for which a recognizable correct pattern of play is programmed. Before each play, he bets 1, 5 or 10 score points on the correctness of his selection. A counter accumulates his wins and losses on such bets to give him an accumulative score for a number of programmed games. Concurrently, each of his bets is evaluated by comparison with what is programmed to be an "appropriate" bet and he is scored over- and under-confidence points on separate counters accordingly as an evaluation of his judgment. In evaluating his bets, adjustment is made (a) for whether his previous play was "right" and hence such that it should raise his confidence, or "wrong" and hence that it should lower his confidence; (b) for whether his accumulated game score is high and hence such as to justify increased confidence, or low and hence such as to lead to decreased confidence; and (c) for increased chances of success from deducing the position of right plays by a process of elimination.

BACKGROUND OF THE INVENTION

This invention relates to a method and apparatus for evaluating qualities of performance by a human subject of what may be called judgment-making.

In the clinical evaluation of certain drugs there is a need for obtaining an objective indication of drug-induced changes in the quality of a subject's judgment-making capabilities. Desirably, a test for this purpose should (1) be easily administered, (2) not require, nor be influenced by, any special skill, previous experience or knowledge on the part of the subject, (3) be minimally dependent upon intelligence or memory, (4) permit administration and scoring without interference by subjective bias on the part of the tester, (5) permit estimations of change in judgment without the subject being aware that judgment is the quality being appraised, (6) permit administration of the test without any special requirement of skill, training, or knowledge on the part of the tester, (7) permit serial appraisals of a subject's judgment at short intervals without significant interference from learning or practice effect, and (8) provide reasonably reproducible test results under similar conditions on different occasions. This invention provides a test method and apparatus which largely meets these desired conditions.

SUMMARY OF THE INVENTION

In accordance with the invention, the method of testing comprises:

(a) Establishing a pre-programmed series of game plays or other situations requiring a judgment selection, in a pattern or sequence in which later correct plays are deducible or recognizable from earlier correct plays;

(b) Having a subject play the game or make the selections, and requiring him to indicate a level of confidence in his judgment as to the correctness of each play or selection he makes, as by wagering one of a plurality of different-value bets on the correctness of his play or selection;

(c) Keeping a game score, based on whether the subject's plays or selections are right or wrong in relation to the programmed plays or selections, and scoring numerical values, plus or minus, for his bets or confidence indications, to provide a game score incentive for the subject which reflects both his success in selecting and the appropriateness of the amounts of his bets;

(d) Concurrently correlating each bet or confidence-level indication with a programmed "appropriate" bet or confidence-level representing good judgment for that play or situation; and (e) Scoring over-confidence and under-confidence points on the basis of such confidence correlations, which with the game score will serve as an evaluation of his quality of judgment.

The programmed "appropriate" bet or confidence level in each case is based on the amount of information available to the subject from previous correct plays. Accordingly, at the start and when the total number of correct plays which have been revealed is not sufficient to enable the subject to deduce the position of the next play with any appreciable probability of correctness, the appropriate bet value will be lowest, say at a value of 1 score point. As more correct plays have been revealed the appropriate bet value will be increased. For example, when the number of correct plays revealed to the subject are sufficient to enable him to deduce the next play with a 50 percent probability of correctness, the appropriate bet value may be raised to an intermediate value, say of 5 score points; and when the previous correct plays enable a deduction of the next play with more than 50 percent probability of correctness, the appropriate bet for such play may be raised to the highest value, say of 10 score points.

Preferably, the method includes one or more of certain adjustments, such as:

(f) Making a running adjustment of the "appropriate" bet- or confidence-level in accordance with the subject's immediately preceding selection success or failure experience to provide allowances for appropriate increases and decreases in the subject's confidence due to such success or failure.

(g) Adjusting upward or downward the number of points recorded for over-confidence, as the subject's accumulation of game score points increases or decreases respectively, and similarly but conversely adjusting points recorded for under-confidence as the game score total changes.

(h) Adjusting the over- and under-confidence evaluations to nullify increased possibilities of deducing correct selections, as when the number of possible right selections has been reduced by previous wrong selections or by some physical limitation of the apparatus used, and thus to nullify the effect of skill or lack of skill of the subject in deducing the correct plays by elimination.

Apparatus in accordance with the invention comprises:

(1) A play board or other selection device on which a subject indicates successive plays or selections. Desirably this is in the form of an array of buttons, of say seven rows and seven columns, which the subject selectively presses in succession, starting at a given point and pressing one button for each play, to (1) find and (2) complete a programmed pattern of plays. In its presently preferred form, the play board does not retain a display of past selections, but might do so if desired.

(2) A programmer for establishing a predetermined series of correct selections on the play board, as in the form of a geometric pattern or sequence of "right" selections on the array of buttons. Desirably this is controlled by an interchangeable record, such as a punched tape.

(3) A confidence selector by which the subject indicates for each play or selection his level of confidence that such play or selection will be "right," for example, whether he knows for sure, considers it likely, or does not know that his selection is "right." Preferably, this selector provides for selection among a limited number of confidence-level expressions, and desirably may be a group of bet buttons by which the subject bets say 1, 5, or 10 score points on each play.

(4) A game score counter which accumulates and displays to the subject a score or record of the subject's success in making right selections and in betting on, or otherwise expressing confidence in his selections. The score is preferably a numerical sum (plus and minus) of the value of his confidence indications or bets on his right and wrong selections, and is preferably displayed as a continuous record as on a strip chart.

(5) A confidence evaluator. This includes a comparator which compares actual bets or confidence indications with "appropriate" bets or confidence indications which a bet programmer determines to be appropriate for each play primarily on the basis of the total relevant information available to the subject from preceding plays for recognizing the programmed pattern of correct plays, and hence appropriate for a certain level of confidence in the correctness of his succeeding play selection. Such comparator is connected to a point-count generator which operates two counters to record over-confidence and under-confidence points depending on whether the actual bet was larger or smaller than the appropriate bet under the circumstances.

(6) Adjusting means. The confidence evaluator is desirably arranged to adjust the appropriate bets and the number of over- and under-confidence points recorded, on a continuous basis in response to a number of factors which may or do develop in the course of the play or test. In a preferred embodiment, the comparator includes a confidence index shiftable between at least three levels and normally set at a low level. This is triggered to a higher level by the programmer at a predetermined point in the game or series of selections, and thereafter the appropriate bet is raised or lowered in response to successive "right" and "wrong" selections, indicating appropriate higher and lower levels of confidence for the next selections or plays.

The evaluator is desirably provided with an over-bet nullifier which prevents the recording of more than a minimum bet when prior wrong selections have by elimination narrowed the selection choice to not more than two possibilities, and thereby to nullify the influence of skill or lack of it in deducing high-probability correct plays by the process of elimination.

The evaluator is desirably interconnected to the game score counter through a confidence-point adjusting module which in response to increasing total score values decreases the over-confidence points and increases the underconfidence points which may be recorded for each play, on the premise that a subject with a high score should display and should feel free to display a higher general level of confidence in his selections, and conversely, that a subject with a low score should display a lower level of confidence in his plays.

In the use of the invention, a subject plays the game by both indicating his bet on each play and making the play. He is motivated to exercise judgment by a desire to accumulate a high score on the score counter. Meanwhile, the confidence evaluator observes his indicated bets as a measure of his level of confidence on successive play, compares his bets with "appropriate" bets, and records over- or under-confidence points accordingly. The record of such points together with his game score accumulation provide an indication of the quality of his ability to make judgments on the basis of available information. The indication may show high over-confidence, high under-confidence, a mixture of both, or little of either. The invention has been found to provide an objective test for evaluating qualities of judgment.

THE DRAWINGS

The accompanying drawings illustrate the invention. In such drawings.

DETAILED DESCRIPTION OF THE PREFERRED EMBODIMENT

Figure 1:
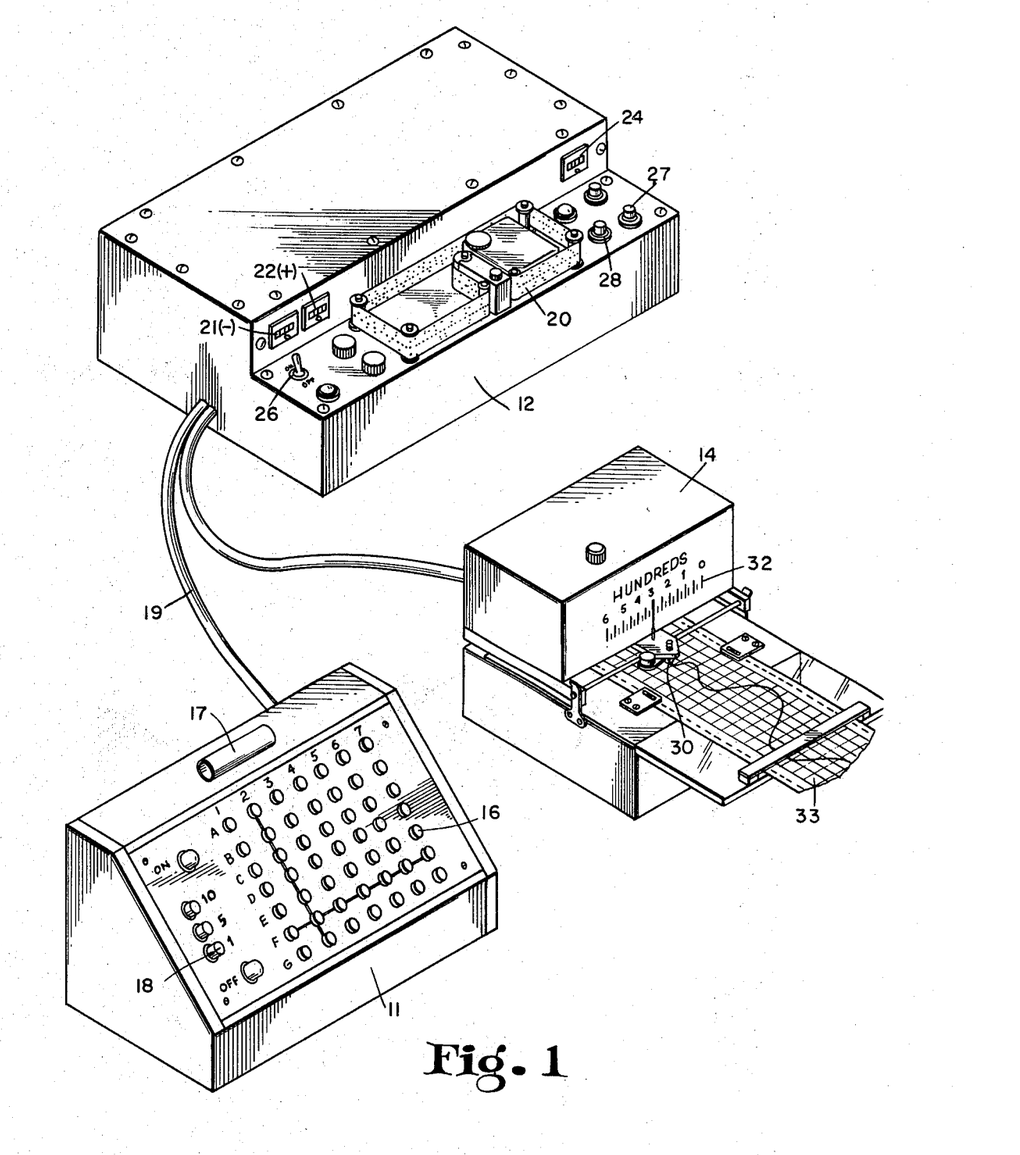
FIG. 1 is a pictorial view of a preferred embodiment of the invention.

The preferred embodiment shown in FIG. 1 comprises a play board 11 on which selection of plays is made, a control console 12, and a score indicator 14.

The play board 11 has a sloping front panel which carries an array of play buttons 16 arranged in seven rows and seven columns. For convenient reference, the seven rows are labeled A to G inclusive and the seven columns are labeled 1 to 7 inclusive, so that the position of each button can be designated by a combination of one letter and one number. For example, button A–1 is the button in the first row in the first column, button F–2 is the button in the sixth row in the second column, etc. Button F–2 is the normal starting button in each game, and to indicate the starting positions, row F and column 2 are marked by lines which intersect at button F–2.

The play board also carries three bet buttons 18, marked respectively "1," "5" and "10," to indicate the score points which are bet by depressing the respective bet buttons 18. The play buttons 16 and the bet buttons 18 actuate electrical switches which are coupled to the control console 12 by a group of conductors 19.

The play board 11 also carries "ON" and "OFF" signal lights to indicate to the player whether or not the play board is ready for play.

The control console 12 includes a punch-tape reader 20 adapted to program into the apparatus a game or sequence of correct plays recorded in punchings in a control tape. The control console 12 also carries a pair of confidence-point counters 21 and 22 which are used to accumulate under-confidence and over-confidence points respectively in accordance with a number of factors, including primarily whether each actual bet on the bet buttons 18 is under or over the appropriate bet on each play as determined by the programming described below, and whether the play involved is right or wrong.

The control console 12 also carries a timer 24 and appropriate controls, including an ON-OFF switch 26, a START button 27, and a FAST ADVANCE button 28 for the tape reader 20.

The score indicator 14 comprises a strip chart recorder having a moving pen 30 which indicates the game score by its position opposite a numbered scale 32 and also by the trace it makes on the paper strip 33.

A "game" is played on this apparatus, as follows: The subject, or player, is assigned an initial score of 100 points, and the pointer on the score indicator 14 is set at 100. For each play, the player first presses one of the bet buttoms 18 to indicate how much he wishes to bet that his next play will be correct—and thus indicates his level of confidence in the correctness of such next play. He then presses that play button 16 which in his judgment is the correct next play. If the play button 16 he presses is the correct one, a chime 17 on the play board 11 sounds, and the score indicator 14 is actuated to increase his score by the amount of his bet. If the button he presses is not the correct play button, the chime does not sound, and the score indicator 14 is actuated to decrease his score by the amount of his bet.

The first correct play in each "game" is always button F–2, at the intersection of row F and column 2 of the button array. All succeeding correct plays are always no more than one button removed horizontally, vertically, or diagonally from the last previous correct play button. After the first play at button F–2, the player determines each subsequent play button by trial and error until such time as he begins to recognize the pattern or sequence in which the correct plays are programmed. When he recognizes the programmed pattern, he then can make successive plays in that pattern and can have greater confidence that his plays will be correct and can bet larger bets accordingly.

The programmed pattern of correct plays is always a simple geometric pattern which the player can recognize after a suitable number of correct plays have been made. In the pattern example shown in FIG. 2, the first correct play is the standard first play at button F–2. The next correct play is diagonally upward and to the right at button E–3. The third correct play is downward at button F–3. The fourth correct play is back at the start, at button F–2. With this pattern of plays, a full game may consist of three cycles of the three play patterns, or a total of nine correct plays, so that the player can recognize the pattern from the first series of plays and can then repeat or follow the pattern in his subsequent plays, with increased confidence and higher bets.

Figures 2, 3, 4, 5:
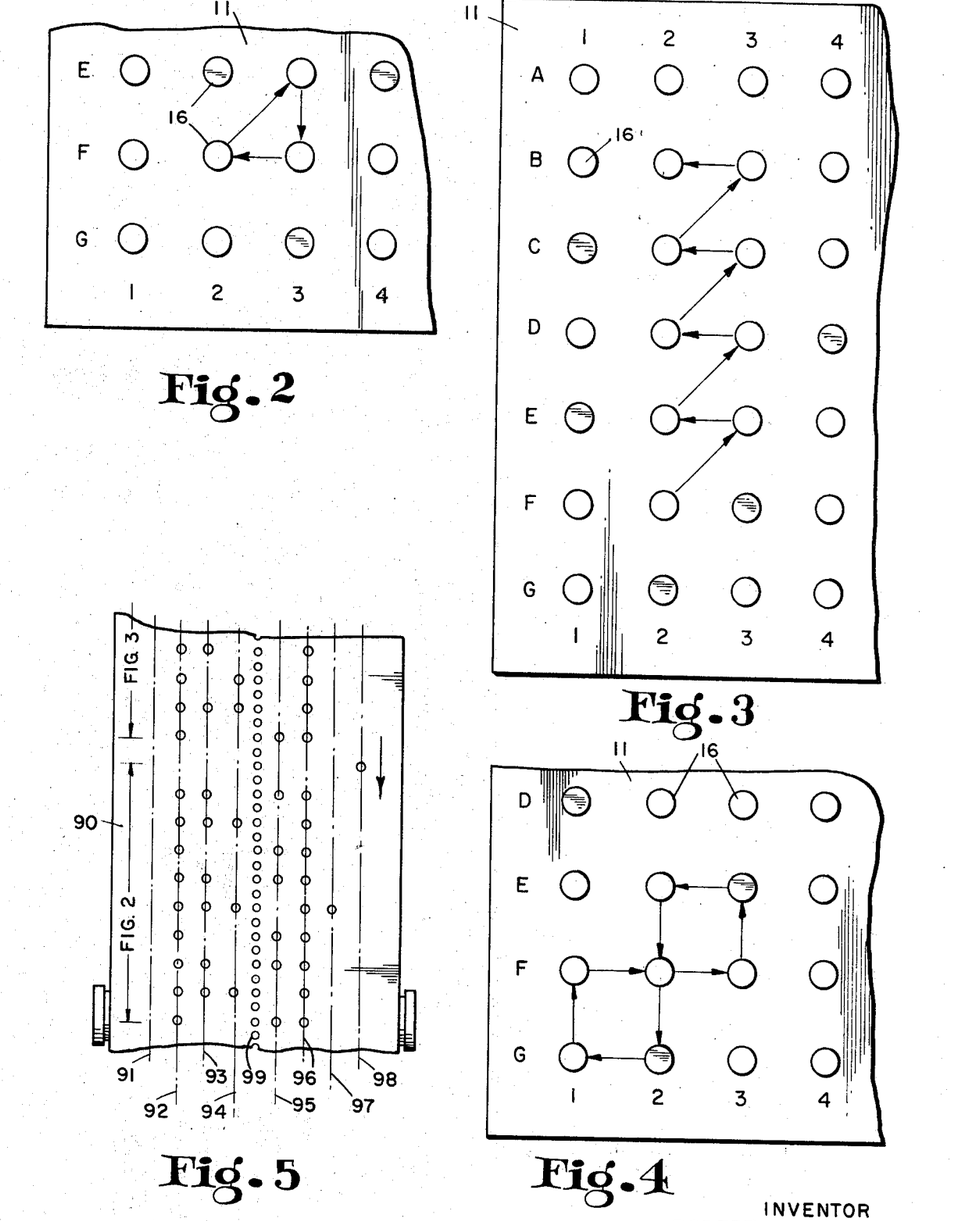
FIGS. 2, 3 and 4 are examples of play patterns or sequences which may be programmed for play on the play board of FIG. 1.
FIG. 5 depicts a section of control tape, punched to program a game using the series of plays of FIG. 2.

Numerous play patterns of varying complexity are possible. A pattern of intermediate complexity is shown in FIG. 3, and comprises a saw tooth progression in which the sequence of correct play buttons is as follows: F–2, E–3, E–2, D–3, D–2, C–3, C–2, B–3, and B–2. In this case, the pattern would be run through only once and would not be repeated, since the pattern progression provides opportunity for the player to recognize the pattern and to follow it in subsequent plays, with increased confidence in his judgment and with higher bets.

A relatively difficult pattern is shown in FIG. 4, and comprises a figure-8 sequence. One cycle of correct play buttons in this pattern is as follows: F–2, F–3, E–3, E–2, F–2, G–2, G–1, F–1, and then back to the start at F–2. This series of plays is run through at least twice in the game.

Games are desirably played in sets, and each "test" comprises a set of games which may be of equal or progressive complexity. With the tape programmer used, I have found it convenient to program 26 games on each tape and in each "test" I have the player play the series of games on a tape for a predetermined period of time, desirably a period of 20 minutes of playing time, and terminate the test at the end of the tape or the time, whichever comes first. At the end of each game of the set, the machine and the time clock are automatically stopped, and the end of the game is signaled to the player by means of the ON and OFF signal lights on the play board 11. Each successive game of the set is initiated by the operator, by pressing the start button 27 on the console 12.

The objective of the player is to accumulate score points on the score indicator 14, as indicated by the position of the pen 30 and the trace made by such pen on the strip chart 33, and this serves as his incentive to play in earnest and quickly.

Meanwhile, however, and desirably without the knowledge of the player, each bet and each play that he makes provide signals which are conveyed to the console 12 where they are utilized to compile information regarding the quality of judgment the player exhibits in his betting and playing. To this end, the bet on each play is compared to a bet which is determined to be appropriate for that play on the basis of the total number of the player's relevant experiences. These will be limited and controlled, and will include the number and positions of the correct plays which have occurred together with certain other factors discussed more fully below.

During the first part of each game, the number of correct plays of that game which are known to the player will be insufficient to permit him to make any rational deduction as to the position of the next correct play. Accordingly, during this phase of the game a bet value of "1" score point is the "appropriate" bet, and any larger actual bet is caused to actuate the confidence-point counter 22 to register over-confidence points for that excessive bet.

At some point in each game the number of preceding correct plays will have revealed sufficient information to permit a rational deduction as to the position of the next correct play with a probability of approximately 50%. This point in the game is predetermined and punched on the control tape, and when it occurs the "appropriate" bet is automatically raised to a vaue of "5" score points. On the next play, if correct, an actual bet above "5" will actuate the counter 22 to register over-confidence points, while an actual bet below "5" will actuate the counter 21 to register under-confidence points. Also, if such next play is correct, the value of the "appropriate" bet is raised to "10", and the actual bet on the next following play, if such play is correct, will be compared with this new value for the purpose of registering confidence-points.

Once the predetermined point in the game has been reached at which the appropriate bet can be raised higher than "1," the value of each appropriate bet is adjusted on the basis of the current performance of the player in making correct and incorrect plays. To this end, once the bet programmer mechanism has raised the appropriate bet value to "5" each subsequent play will affect the value of the appropriate bet for the following play. If the play is correct, this will energize mechanism to raise the appropriate bet by one level, i.e. from "1" to "5" or "5" to "10." On the other hand, if the play is *incorrect*, this will energize mechanism to lower the appropriate bet by one level, i.e. from "10" to "5" or "5" to "1."

The recording of under-confidence points takes account of situations in which the player may not be able to find the correct pattern, or may forget the position of his last correct play or his position in the sequence of plays. In such situations, if the player appropriately indicates a lack of confidence that his next play will be correct and bets only "1" on a play which would otherwise have an appropriate bet of "5" or "10," and if his next play is in fact incorrect, he is not charged with under-confidence points, since his bet of only "1" may indeed represent good judgment rather than poor judgment. Further, as noted above, the incorrect play will adjust the appropriate bet one step downward, and this adjustment will be repeated if his next following play is also incorrect, with the result that as long as his confusion persists and he continues to make incorrect plays, the appropriate bet will be reduced to and remain at the lowest bet value of "1." However, if the player finds his place and begins to make correct plays, the appropriate bet will be raised one level for each correct play. The "appropriate" bet value is thus automatically adjusted, step by step, to a variety of playing performances, while retaining sensitivity to those actions which are revealing of judgement abilities.

It is never necessary to record under-confidence points when the actual bet is below the appropriate bet and the play involved is *in*correct, and the preferred apparatus does not do so. On incorrect plays the apparatus records over-confidence points when the actual bet is higher than a minimum bet; that is, if the actual bet is "5" or "10" and the play is incorrect, the present apparatus records 4 over-confidence points for the "5" bet and 8 such points for the "10" bet, regardless of the level of the "appropriate" bet for that play or of the subject's existing score.

The magnitude of the player's accumulated score in any one set of games is also taken into account in determining the number of over-confidence or under-confidence points recorded on correct plays. This is done progressively, in predetermined steps. The maximum number of over-confidence points is recorded when the player has a low game score, and the number of such over-confidence points scored for excessive bets is progressively decreased as the game score increases past certain selected points. Conversely, the minimum number of under-confidence points is scored when the player has a low score, and such number of under-confidence points scored is progressively increased as the game score increases past the selected points. Also, the number of over-confidence and under-confidence points scored at any game-score level is varied in accordance with the amount by which the actual bet exceeds the appropriate bet. The following table shows the number of over-confidence and under-confidence points which are scored under various circumstances.

TABLE I.—OVER-CONFIDENCE (+) AND UNDER-CONFIDENCE (−) POINTS SCORED FOR INAPPROPRIATE BETS ON CORRECT PLAYS AT DIFFERENT ACCUMULATED GAME SCORE TOTALS

| Appropriate bet | Actual bet | Game scores | | | | | |
|---|---|---|---|---|---|---|---|
| | | 0-50 | 50-140 | 140-230 | 230-320 | 320-410 | 410 plus |
| | | Over-confidence (+) and under-confidence (−) points | | | | | |
| 1 | 10 | +8 | +6 | +5 | +4 | +3 | +2 |
| | 5 | +4 | +3 | +2 | +2 | +1 | +1 |
| | 1 | 0 | 0 | 0 | 0 | 0 | 0 |
| 5 | 10 | +4 | +3 | +2 | +2 | +1 | +1 |
| | 5 | 0 | 0 | 0 | 0 | 0 | 0 |
| | 1 | −1 | −2 | −3 | −3 | −4 | −4 |
| 10 | 10 | 0 | 0 | 0 | 0 | 0 | 0 |
| | 5 | −1 | −2 | −3 | −3 | −4 | −4 |
| | 1 | −2 | −4 | −5 | −6 | −7 | −8 |

Apparatus providing the above described method of play and operation is shown diagrammatically in FIGS. 5-8.

BLOCK DIAGRAM, FIG. 6

Figure 6:
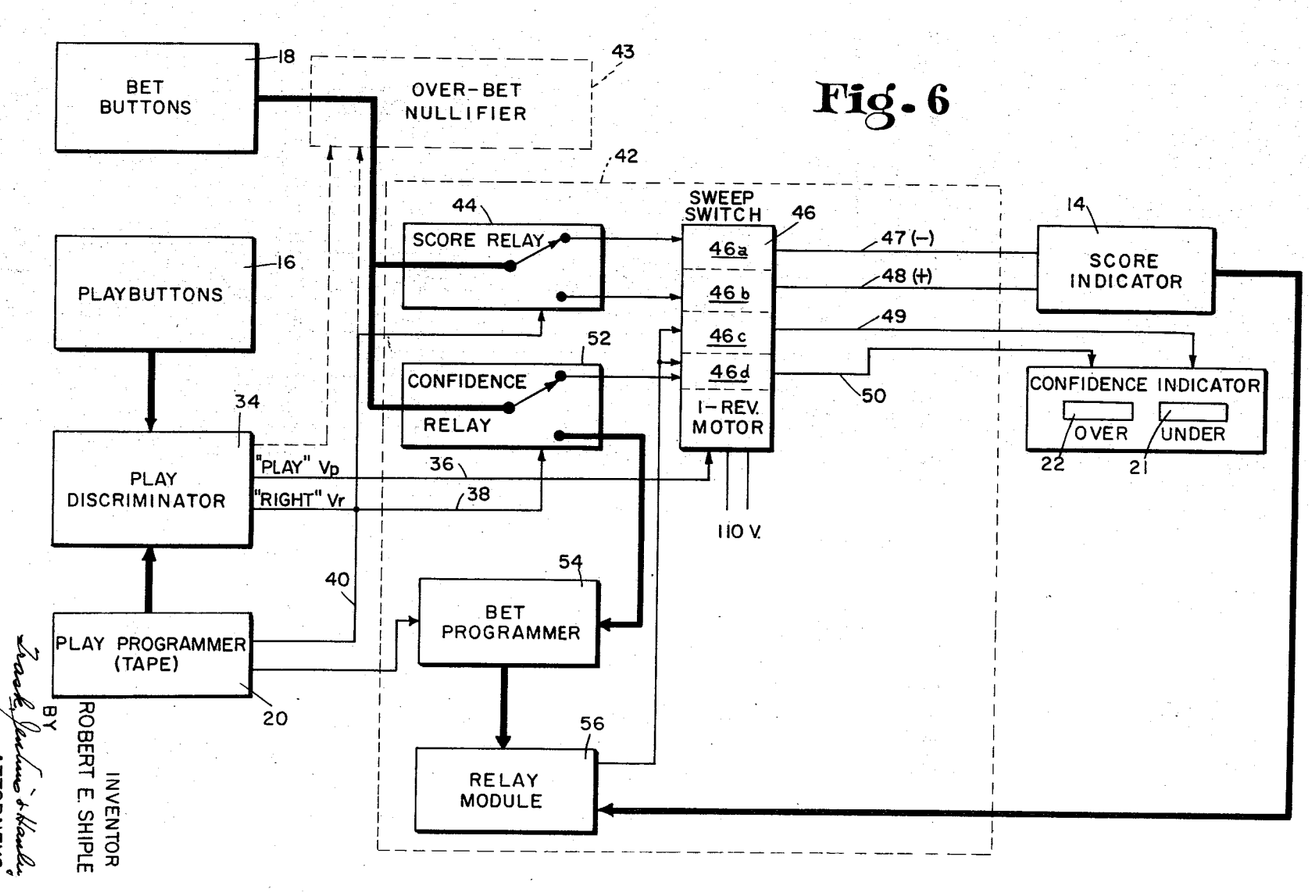
FIG. 6 is a block diagram of the functional parts of the apparatus shown in FIG. 1.

In the block diagram of FIG. 6, all blocks in the diagram are part of the control console 12, except for the play buttons 16, the bet buttons 18, and the score indicator 14. As shown by FIG. 6, the output of the play buttons 16 is fed to a comparator or play discriminator 34 which also receives the principal output from the play programmer 20 and which produces a "play" signal $Vp$ on the output lead 36 whenever any play button is pushed, whether or not the play was correct, and which produces a "right" signal $Vr$ on the output lead 38 when a play is correct. The "right" signals $Vr$ are fed back to the play programmer 20 through a conductor 40 to advance the programmed game in response to each correct play.

Both right and play signals $Vr$ and $Vp$ are fed to a control set 42 comprising a number of components enclosed in a dotted line in FIG. 6. The output of the bet buttons 18 is also fed to this control set 42. The control set 42 determines the number of points to be added or subtracted on the score indicator 14, and determines the number of over-confidence points and under-confidence points which are to be registered on the confidence point counters 21 and 22.

Figure 9:
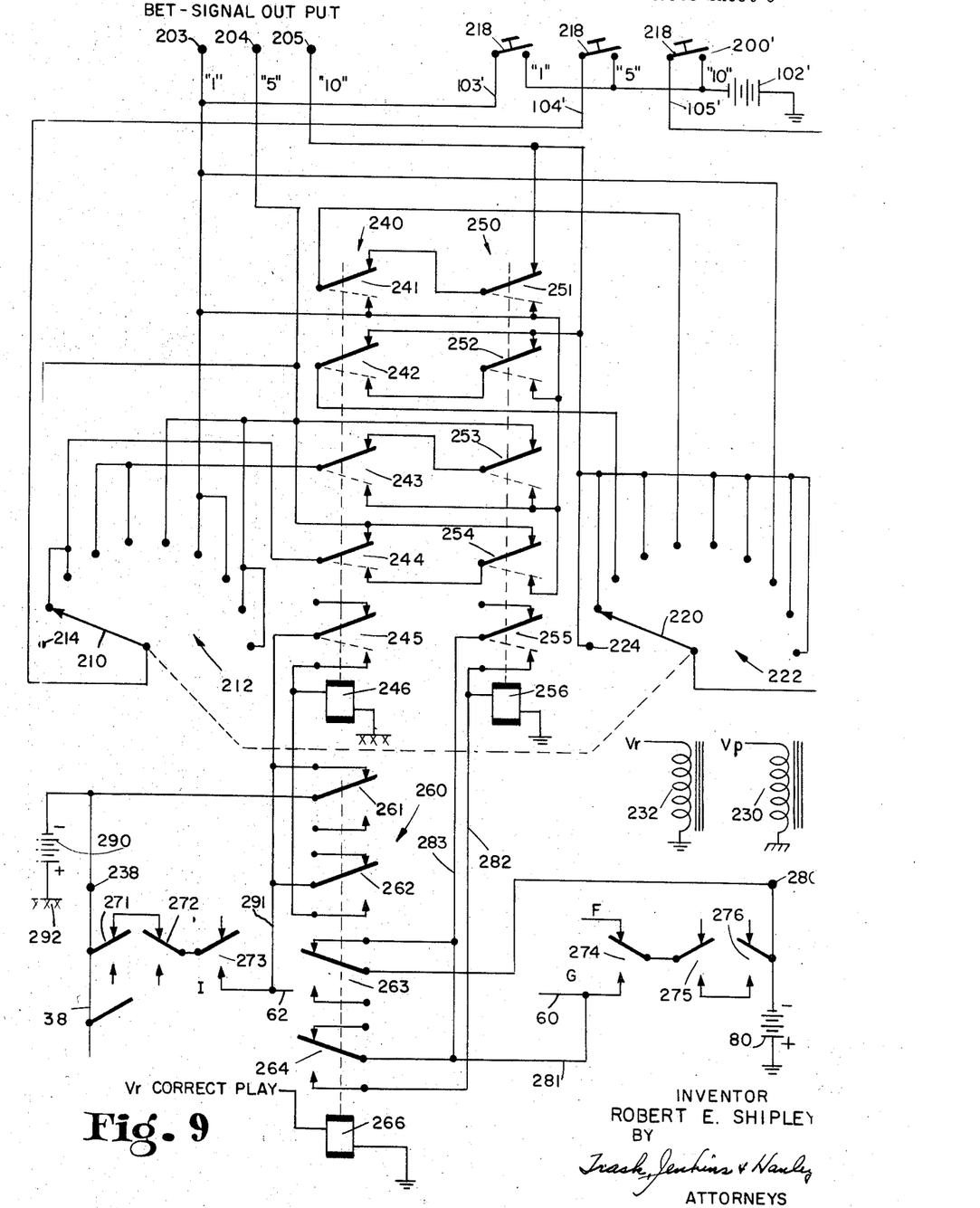
FIG. 9 is a circuit diagram of an over-bet nullifying device which is desirably employed.

Certain over-bets are desirably nullified by an over-bet nullifier 43 further shown in FIG. 9.

GAME SCORING

The portion of the control assembly 42 which operates the score indicator 14 comprises a score-control relay 44 actuated by each "right" signal $Vr$, which transmits output voltage signals from the bet buttons 18 selectively to one of two layers 46a or 46b of a multi-layer sweep switch 46. The sweep switch 46 generates one, five, or ten score point pulses depending on the size of the bet, and transmits such pulses through "increase" and "decrease" leads 47 and 48 to actuate the score indicator 14 to add or subtract a corresponding number of score points, depending on whether the play is correct or incorrect. The sweep switch 46 is actuated through a sweep cycle in response to each play signal $Vp$, transmitted to it through the conductor 36.

CONFIDENCE-POINT SCORING

The confidence indicators 21 and 22 are similarly controlled by two layers 46c and 46d of the sweep switch 46, which transmit pulses through the leads 49 and 50 to actuate the confidence point counters 21 and 22. The generation of such pulses, their number, and whether they are delivered to the over-confidence point counter 22 or the under-confidence point counter 21 is controlled by inputs to the switch 46 from other components. Such inputs include the play signal $Vp$ from the play discriminator 34 through the conductor 36, input from a confidence relay 52 responsive to the bet buttons 18 and the "right" signal $Vr$, and input from a relay module 56 responsive to the magnitude of the game score on the score indicator 14 and to a bet programmer 54.

RIGHT/WRONG PLAY DISCRIMINATION

Figure 7:
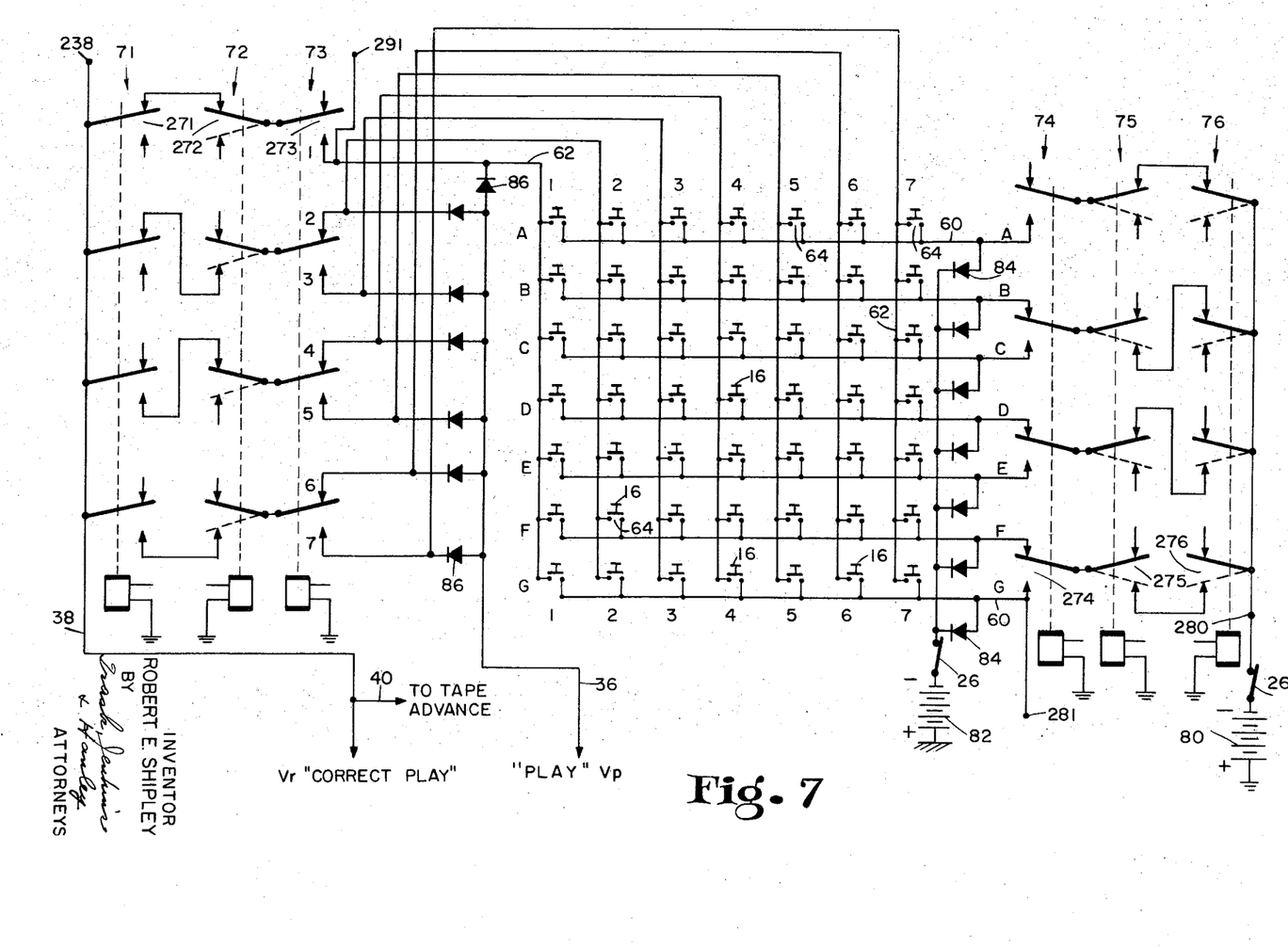
FIG. 7 is an electrical diagram showing a play-comparator circuit in which the play buttons control switches coupled to tape-controlled relays, to discriminate between right and wrong plays and to deliver a D.C. output voltage at one output terminal when *any* play is made, whether right or wrong, and another D.C. output voltage at another output terminal when the play is correct.

The circuits of the play buttons and play discriminator are shown in FIG. 7. The play button circuits comprise a switch matrix which has a separate horizontal conductor 60 for each play button row A-G, and a separate vertical conductor 62 for each play-button column, and each intersection of such conductors 60 and 62 is provided with a play switch 64 actuated by the play button 16 at that intersection.

The play discriminator 34 comprises six four-pole, double-throw relays 71-76 which are connected to define the 49 play positions on the play board. The discriminator relays are arranged in two groups of three. The relays 71, 72, and 73 are connected to discriminate between the seven columns of the matrix, and have their four layers of switches arranged to make selective connections for the seven column conductors 62. The relays 74, 75 and 76 are arranged to discriminate between the seven rows of the matrix and are arranged to make selective connections for the seven horizontal row conductors 60.

The discriminator relay 73 has contacts connected respectively to the column conductors 62 of the matrix, and has its poles connected to the poles of the relay 72. The contacts of relay 72 are connected to the contacts of relay 71 in a pattern as shown in FIG. 7, and the poles of relay 71 are connected together and to the output conductor 38 which carries the "right" output signal $Vr$. Such conductor 38 is also connected to the conductor 40 leading to the advance mechanism of the play programmer 20.

Similarly, the contacts of relay 74 are connected to the row conductors 60 of the matrix, and the poles of such relay 74 are connected to the poles of the relay 75. The contacts of relay 75 and 76 are interconnected in the pattern shown in FIG. 7, and the poles of relay 76 are connected together and to a first power source, here shown as a D.C. battery 80. The battery 80 provides the source of D.C. potential for the "right" output signal V$r$, which constitutes the output signal on the conductor 38 when the button 16 played is the correct button.

The relays 71–76 have separate actuating coils 78 which are selectively energized under control of the play programmer 20, as will be described.

The "play" signal V$p$ which is impressed on the output conductor 36 of the play discriminator 34 is derived from a second power source, shown in FIG. 7 as a second battery 82. Such V$p$ signal is controlled by the same play-button switches 64 which control the V$r$ signal, but the two signals are independent. To this end, one side of the second battery 82 is connected through separate isolating diodes 84 to the seven horizontal row conductors 60; and the output lead 36 is connected through separate isolating diodes 86 to the seven column conductors 62. With the two separate power supplies 80 and 82, and with the connections described, the switch 64 at each play button 16 performs two functions. In every case the depression of any play buttons 16 to close its switch 64 closes a circuit from the second battery 82 through the diodes and the closed switch to the output lead 36, to deliver a "play" signal V$p$ at the output lead 36. Also, if the play button which is pressed is the correct play button as determined by the positions of the discriminator relays 71–76 as controlled by the programmer 20, the subsequent closing of the correct switch 64 will establish a circuit from the first power supply 80 through the relays and the play button switch to the output lead 38 to deliver a "right" signal V$r$ at the output lead 38.

For example, if the relays 72, 75 and 67 are actuated, as indicated in dotted lines in FIG. 7, this will establish a circuit from the first power supply 80 through the relays 76, 75 and 74 to the horizontal conductor 60 for row F of the play button matrix; and will establish a circuit from the vertical conductor 62 of column 2 of the matrix to the output lead 38. Under these conditions, depression of the button 16 at the F–2 position on the button array will complete a circuit from the first power supply 80 to the output lead 38. All other circuits from the power supply 80 to the output lead 38 will be open at one point or another in the relays 71–76, so that the button of the F–2 position is the correct play button and all others will be incorrect and inoperative to generate an output signal at the output conductor 38.

Simultaneously, however, the pressing of any button 16, whether at the F–2 position or elsewhere will establish a circuit from the second supply source 82 through the matrix to the output lead 36 to generate a "play" signal V$p$ at that output lead 36.

PLAY PROGRAMMING

The play programmer 20 comprises a tape reader controlled by a tape 90 having eight rows of program holes 91–98, plus a row of drive holes 99 by which the tape is driven. In any reading position of the tape 90 in the reader 20, if a hole is present in a row, such hole is detected by the reader and in consequence a voltage is applied at a corresponding output lead. The output leads controlled by the first six tape rows 91–96 are connected respectively to actuate the operating coils of the discriminator relays 71–76. The output lead controlled by the seventh tape row 97 is connected to energize the bet programmer 54 at a proper time in the course of each game. The lead controlled by the eighth tape row 98 is connected to actuate a stop relay to reset the mechanism for a new game and de-energie the mechanism at the end of the game.

The pattern of holes shown on the tape in FIG. 5 is the pattern corresponding to the game shown in FIG. 2. Thus, in the lowermost transverse set of holes, which will be read first, there are holes in tape rows 92, 95, and 96, which serve to cause actuation of relays 72, 75, and 76, as indicated in dotted lines in FIG. 7. This establishes the play button at position F–2 as the correct button for play, as described above. If that button is played, a "right" signal V$r$ is delivered at the output lead 38 and this energizes the lead 40 to advance the tape reader 20 one step. This brings the next transverse line of holes on the tape into reading position, and these will then cause actuation of the relays 71–76 in a corresponding manner to establish another button as the correct button for play, in this case, the button at the position E–3. The successive transverse lines of holes shown in the tape 90 will program the play buttons for a sequence of plays in the pattern shown in FIG. 2, and will run through such pattern three times. Near the end of the first repetition of the pattern, that is, when the fifth transverse line of holes is read, the hole in the row 97 of the tape will be read and this will cause the bet programmer 54 to be energized, so that the appropriate bet value will be raised from a value of "1" to a value of "5" on the next correct play.

BET SCORING

Figure 8:
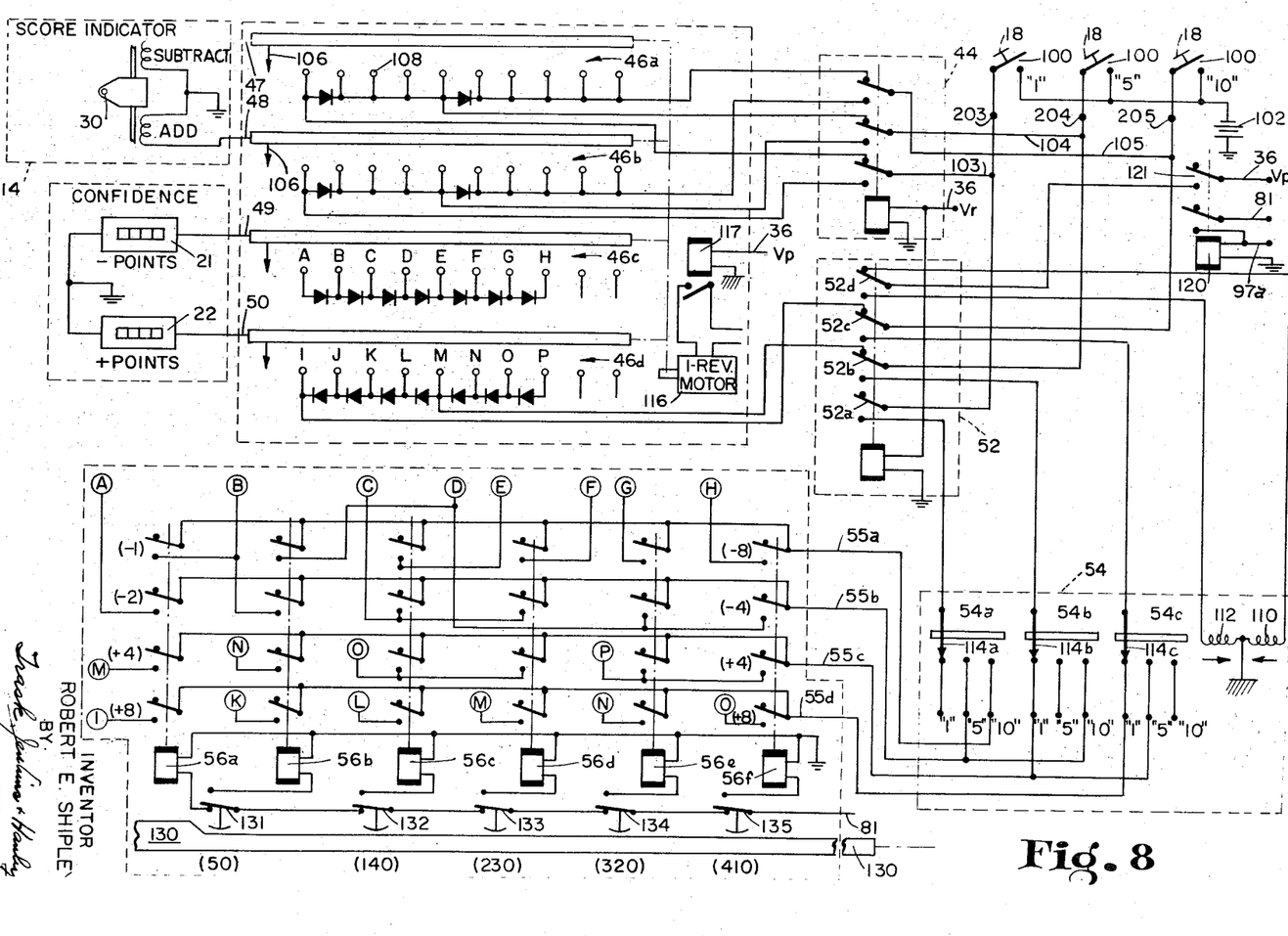
FIG. 8 is an electrical diagram of control and totalizing mechanism actuated by the outputs from the circuits of FIG. 7.

The bet buttons 18, shown at the upper right of FIG. 8, actuate separate switches 100 which are interlocked by means (not shown) which holds any one switch closed and releases the others when that one is closed, so that the three switches provide selection of the bet values of 1, 5, and 10 score points assigned respectively to the three buttons. One side of each switch 100 is connected to a power supply such as a battery 102, and the other sides of the three switches are connected by conductors 103, 104 and 105 to the poles of a three-pole double-throw relay which constitutes the score relay 44 and which has its coil connected to the output lead 38 which carries the "right" play signal V$r$. The score relay 44 determines whether the bet circuits will be connected to the first layer 46$a$ or the second layer 46$b$ of the sweep switch 46.

Such sweep switch comprises a plurality of such layers. Each layer has a sweep arm 106 and a series of ten swept contacts 108, and the sweep switch is driven by a one-revolution motor 116 which is suitably energized through a relay 117 which closes in response to each "play" signal V$p$ at the output lead 36 from the play button matrix. On each actuation of the sweep switch 46, the arm 106 at each layer sweeps all ten of the swept contacts 108 at that layer, and generates a number of pulses depending upon which of the swept contacts 108 are connected to a voltage source during that sweep.

The two upper layers 46$a$ and 46$b$ of the sweep switch 46 control, respectively, the two coils which cause subtraction and addition of score points on the score indicator 14, in the following manner:

The normally-closed contacts of the score relay 44 connect the three bet switches 100 to selected points along the series of swept contacts 108 of the top sweep layer 46$a$. The 1-point bet switch 100 is connected through conductor 103 to the pole of the bottom switch of the relay, and the normally closed contact of this switch is connected to the first swept contact 108 of the layer 46$a$, and this contact is isolated from the other contacts by an isolating diode. Accordingly, if the 1-unit bet switch is closed (the other two bet switches being open) the full sweep of the sweep arm 106 across the swept contacts 108 will generate a single pulse as the output to the score indicator 14, and such pulse will be delivered to the "subtract" coil of such score indicator to subtract one point from the existing score. Likewise, the 5-unit and 10-unit bet switches are connected by conductors 104 and 105 to the poles of the other two switches of the score relay 44, and through the normally-closed contacts of those relay switches are connected respectively to the fifth and tenth swept contacts 108 of the sweep layer 46$a$. The fifth contact 108 is isolated from the five subsequent swept contacts 108 by an isolating diode. Accordingly, if the 5-unit or 10-unit bet switch is closed, the full sweep of the sweep arm 106 of this layer will generate five or ten pulses, and these will be delivered to the "subtract" coil of the score indicator 14 to subtract 5 or 10 points from the game score.

The foregoing operation of the bet switches and score relay 44 assumes that the plays on which the bets were made were all *in*correct plays, so that the relay remains in normally closed position and the mechanism operates to subtract score points from the game score. If the play on which the bet is made is a correct or "right" play, then the signal V*r* at the output lead 38 in FIG. 7 will actuate the score relay 44 to its normally open position. This will connect the three bet switches to the second layer 46*b* of the sweep switch 46 in the same manner described above for the top layer 46*a*. The bet response will then occur in the second layer 46*b*, and will generate one, five or ten pulses to actuate the add coil of the score indicator 14 and to add 1, 5, or 10 points to the game score on the indicator 14, depending upon which of the bet buttons is pressed by the player.

CONFIDENCE POINT SCORING

The third layer 46*c* of the sweep switch 46 generates pulses to actuate the under-confidence point recorder 21, and the fourth layer 46*d* generates pulses to actuate the over-confidence point recorder 22, in a manner similar to the operation of the first two layers 46*a* and 46*b*. In layer 46*c*, only the first eight swept contacts 108 are used, and these are serially isolated from each other by diodes in a manner such that connection to any one contact will establish connection to all those to the left of it and isolate those to the right of it, so that each sweep of the arm 106 to the right will generate one under-confidence point pulse for every contact up to and including the contact at which connection is made during that sweep. The swept contacts of this layer 46*c* are labeled A to H to indicate their points of connection to the terminals marked A to H in the relay module 56 shown at the bottom of FIG. 8 and described below.

The fourth layer 46*d* generates pulses to actuate the over-confidence point recorder 22. As in layer 46*c*, this layer uses only the first eight of the swept contacts, and these are serially isolated from each other by diodes in an opposite sense to that of layer 46*c*, and in a manner such that connetcion to any one contact will establish connection to all those (of the eight) to the right of it and isolate those to the left of it. Thereby, each sweep of the arm 106 to the right will generate one over-confidence point for the contact at which connection is made and for every contact (of the eight) to the right of it. For example, if connection is made to the fifth swept contact (M), four over-confidence point pulses will be generated on each sweep, one at each of the contacts M, N, O and P. The swept contacts of this layer 46*d* are labeled I to P to indicate their points of connection to the terminals of the relay module 56 shown at the bottom of FIG. 8. Operation of the third layer 46*c* and fourth layer 46*d* of the sweep switch 46 to generate confidence point pulses is controlled both by the confidence relay 52 and by the relay module 56, which are coupled to each other through bet programmer 54.

As has been indicated, if an incorrect play is made, the player is in no event charged with under-confidence points, but he is charged with over-confidence points depending upon the size of his bet, regardless of what the "appropriate" bet may be. If he bets "10" he is charged with 8 over-confidence points and if he bets "5" he is charged with 4 over-confidence points. This is handled by the confidence relay 52, and is independent of the magnitude of the subject's accumulated game score.

THE CONFIDENCE RELAY

The confidence relay 52 comprises a four-pole double-throw relay having an actuating coil connected to be energized by the "right" signal V*r* generated at the output lead 38 of the circuits shown in FIG. 7. The top switch 52*d* controls the bet programmer 54, as described below. The poles of the bottom three switches 52*a*, 52*b* and 52*c* of the confidence relay 52 are connected respectively to the 1-unit, 5-unit, and 10-unit bet switches 100. The normally-closed contact of the switch 52*a* is left open since no over-confidence points are to be charged if the bet is "1." The normally-closed contact of the switch 52*b* is connected to the fifth swept terminal (M) of the over-confidence pulse layer 46*d* of the sweep switch 46, so that such layer will generate four over-confidence point pulses if a circuit is established through that connection, as described above, in response to an over-bet of "5" on an incorrect play, which pulses will actuate the over-confidence point counter 22 to increase the count on that counter by four. Correspondingly, the normally-closed contact of the switch 52*c* is connected to the first swept contact (I) of the layer 46*d* of the sweep switch 46, so that a circuit through this path in response to an over-bet of "10" on an incorrect play will cause eight point pulses to be generated as the sweep arm sweeps the swept contacts of that layer, which pulses will actuate the over-confidence point counter 22 to increase the count on that counter by eight.

Confidence points are also assigned when the player makes a correct play; however, a number of weighing factors are taken into account in determining the number of confidence points which are scored for bets made on correct plays. The elements which bring these other factors into account include the bet programmer 54, the stage of the game at which such programmer is energized by the programming tape in response to a hole in row 97 of that tape, and the relay module 56 which is responsive to the accumulated game score total.

THE BET PROGRAMMER

As shown at the lower right of FIG. 8, the bet programmer 54 comprises a three-section, three-position bet stepper switch. The three sections 54*a*, *b* and *c* have moving arms 114*a*, *b* and *c* which are jointly actuated to the right or left by actuating coils 110 and 112. The moving arm of each section moves between three fixed contacts representing three "appropriate" bet values of "1," "5" and "10." The three moving arms 114*a*, *b* and *c* are connected respectively to the normally open contacts of the switches 52*a*, 52*b*, and 52*c* of the confidence relay 52. Accordingly, when the confidence relay 52 is actuated by a "right" signal V*r*, the three moving arms of the bet programmer switch 54 are connected respectively to the three bet switches 100, and the bet indicated on those switches will establish a voltage on one of the stepper switch arms 114. The subject's actual bet so indicated will be "compared" with the "appropriate" bet represented by the position of the three moving arms 114*a*, *b* and *c* with respect to their fixed contacts. The fixed contacts are connected in the pattern shown to four output leads 55 to the relay module 56, respectively for signals corresponding to two over-bet levels and two under-bet levels. Lead 55*a* represents an under-bet which is two steps below the appropriate bet, i.e., a bet of "1" when "10" is appropriate; lead 55*b* represents an under-bet one step below the appropriate bet; lead 55*c* represents an over-bet one step above the appropriate bet; and lead 55*d* represents an over-bet two steps above the appropriate bet.

As shown, the bet stepper switch 54 is in the position representing an "appropriate" bet of "1," and its arms 114 are in engagement with the "1" contacts in each section. In the stepper section 54*a* this "1" contact is open so that an actual bet of "1," coinciding with the appropriate bet, will produce no signal beyond this point. In the other two stepper sections 54*b* and 54*c*, which are in series with "5" and "10" bet switches 100, the "1" contacts are connected respectively to the output leads 55*c* and 55*d* to the relay module 56, so that if the actual bet is "5" or "10," a one-step or two-step over-bet voltage signal will be transmitted to that relay module for actuation of the over-confidence point counting mechanism.

The center position of the stepper switch 54 corresponds to an "appropriate" bet of "5." Accordingly, the "5" terminal of the center section is open, while the "5" terminal of the left section 54a is connected to the output lead 55b representing a one-step under-bet, and the "5" terminal of the right section 54c is connected to the lead 55c representing a one-step over-bet.

The right end position of the stepper switch 54 represents an appropriate bet of "10." The "10" contact of the right section 54c is open, while the "10" contacts of the sections 54a and 54b are connected respectively to the two-step under-bet letd 55a and the one-step under-bet lead 55b.

Accordingly, if the actual bet indicated by closure of one of the bet switches 100 coincides with the "appropriate" bet as respresented by the position of the stepper switch 54, and the play is correct, no under-bet or over-bet signal will be transmitted to the relay module. If, however, the actual bet does not coincide with the appropriate bet, then the bet programmer will transmit a signal through one of the four output leads 55 to the relay module—through lead 55a if the bet is a two-step under-bet, lead 55b if the bet is a one-step under-bet, through lead 55c if the bet is a one-step over-bet, and through lead 55d if the bet is a two-step over-bet.

At the beginning of any game, the bet programmer 54 is positioned in its "1" position, as shown, representing an appropriate bet of "1," and the drive coils 110 and 112 are maintained de-energized until the game has progressed to the point at which higher bets are appropriate. To this end, the bet programmer is energized through a normally open latching relay 120 connected to receive a closing impulse through a lead 97a when a hole is read in the row 97 of the tape 90. The relay is held closed by a holding potential from the battery 80 (FIG. 7) through a lead 81. The pole of the switch 121 of the relay 120 is connected to the output lead 36 of FIG. 7, to receive a play signal Vp in response to each play. When the relay 120 is closed, this signal is transmitted to the pole of the top switch 52d of the confidence relay 52. In normal position, representing an incorrect play, this pole engages a contact connected to the coil 110 of the bet programmer 54 and such coil, when energized, acts in the direction to step the bet stepper switch one step downward, to the left in FIG. 8, in response to each such incorrect play. When the play is correct, the confidence relay 52 will be actuated to its normally open position, and the switch 52d will then transmit the play signal Vp to the opposite coil 112 of the bet stepper switch 54 which acts in the direction to step the switch one step upward, to the right in FIG. 8, on each actuation in response to a correct play.

Accordingly, once the bet programmer 54 is activated by closure of the tape-controlled relay 120, it is then energized on each incorrect play to step the "appropriate" bet down one step and is energized on each correct play to step the "appropriate" bet up one step.

THE RELAY MODULE

The relay module 56 comprises six four-pole double-throw relays 56a to 56f energized by five microswitches 131–135, which are controlled by cam means 130 driven by or with the score indicator 14. The switches 131–135 energized from the lead 81 from the first power supply battery 80 shown in FIG. 7, and are normally connected in series by their normally-closed contacts so that only the relay 56a is energized. As the score accumulated on the score indicator 14 passes the predetermined levels of 50, 140, 230, 320, and 410 total score points, the cam 130 successively actuates the microswitches 131–135, to energize in succession the other five relays 56b–56f of the relay module.

The over-bet and under-bet signal leads 55a–55d from the bet programmer 54 are connected respectively to the poles of separate double-throw switches in each of the six relays 56a–56f. The normally-open contacts of those relays are connected to the swept contacts of the third and fourth layers 46c and 46d of the sweep switch 46. The leads 55a and 55b from the bet programmer 54, which carry two-step and one-step under-bet signals, are connected, respectively, to the poles of the two upper-most switches of each of the relays 56a and 56f. The contacts of those switches are connected as indicated by the letters A–H to the swept contacts A–H of the third layer 46c of the sweep switch 46, to apply voltages selectively to those swept contacts in a selection determined by the positions of the relay switches. When such contacts A–H are swept by the sweep arm 106, such voltages will create pulses to actuate the under-confidence counter 21 to record a corresponding number of over-confidence points.

In similar manner, leads 55c and 55d from the bet programmer 54, which carry one-step and two-step over-bet voltage signals, are connected respectively to the poles of the two lower most switches of each of the relays 56a and 56f. The contacts of those switches are connected as indicated by the letters I–P to the swept contacts I–P of the fourth layer 46d of the sweep switch 46, to apply voltages selectively to those swept contacts in accordance with the positions of the module relays 56a–56f.

An example will indicate the operation of the relay module. Assume that the appropriate bet is "10" and the actual bet is "1." Assume also that the play is correct so that the confidence relay 52 is actuated by a Vr signal to connect the bet switches 100 to the bet programmer switch 54. The bet programmer switch will be in its right-most position representing the appropriate bet of "10." The actual bet of "1" will produce a voltage signal on the output lead 55a from the bet programmer which will be applied to the poles of the uppermost switches of the module relays 56a–56f. If the score is below 50, so that all the microswitches 131–135 are closed, the only relay which is closed will be the relay 56a, as shown in dotted lines in FIG. 8, and this will transmit the voltage signal to terminal B, connected to the second swept contact of the third layer 46c of the sweep switch 46. When that switch 46 makes its sweep in response to the play, it will generate two voltage pulses in its under-confidence layer 46c, from the contacts A and B of that layer, and these pulses will actuate the under-confidence point counter 21 to score two under-confidence points. If under the same conditions, the accumulated score is above 410, the microswitch 135 will be actuated to energize the module relay 56f. In such case, the under-bet voltage signal on the lead 56d from the bet programmer will be transmitted through the closed uppermost switch of the module relay 56f to the terminal H of the relay module. This is connected to the eighth swept contact of the third layer 46c of the sweep switch 46, and through this connection voltages will be applied to all eight of the swept contacts A through H. In consequence, operation of the sweep switch 46 will generate eight pulses to actuate the under-confidence point counter 21 to register eight additional under-confidence points. In this manner, the number of confidence points recorded as the result of a two-step under-bet signal on the output line 55d from the bet programmer 54 will be varied in accordance with the size of the game score and the consequent position of the cam 130 with respect to the microswitches 131–135 controlling the module relays. One-step under-bet signals will be handled in similar manner by the second layer of switches of the relay module. A corresponding but converse variation of the over-confidence points is provided by the two lower-most switches of the several relays, which are connected as indicated by the letters I–P to the swept terminals I–P of the fourth layer 46d of the sweep switch which controls the over-confidence counter 22.

The connections shown in FIG. 8 provide for scoring under-confidence and over-confidence points on the counters 21 and 22 in accordance with the foregoing Table I.

THE OVER BET NULLIFIER

It is desirable to nullify high bets which may be arrived at by a process of elimination from a series of incorrect plays, since such bets may not be a measure of the judgment-making ability which it is desired to evaluate.

After a completed correct play on a play button 16 at any location other than at an edge of the button array, there are eight possible positions for the next play. If a player makes incorrect plays at six of the eight possible positions, and recognizes that he has done so, he can recognize a 50-percent probability of correctness for a play on either of the remaining two positions. If he makes incorrect plays at seven of the possible eight positions, and recognizes that he has done so, he can know for sure that the one remaining play position is correct, and can make a high bet on that sure play. However, these bets on high-probability or sure plays will not reflect a recognition of the programmed play pattern, nor a judgment based on such recognition, and hence they are not a measure of the subject's ability to make judgments on the basis of the information furnished by the program. Accordingly, a high bet under these circumstances is desirably nullified and adjusted to a bet value of "1." This is done by counting each series of incorrect plays and reducing "5" bets to "1" on the seventh and eighth plays of a series and reducing "10" bets to "1" on the eighth play of a series.

When the completed correct play is at an edge of the button array as in column 1 or row G, there are only five possible next-play positions, and when the completed correct play is at a corner of the array, as at button G–1, there are only three possible correct-play positions. Accordingly, the bet reduction is made effective earlier under these circumstances.

FIG. 9 shows apparatus for reducing to a value of "1" all higher bets which may be based on a process of elimination from a series of incorrect plays. This apparatus has bet buttons 218 and bet switches 200 corresponding to those of FIG. 8, and has bet-signal output terminals 203, 204 and 205. Such terminals are connected to conductors 103, 104 and 105 at points 203, 204 and 205 in FIG. 8 in place of the bet button switches 100. The bet buttons 218 and switches 200 close circuits between a battery 102' and leads 103', 104' and 105'. The lead 103' from the 1-unit bet switch is connected directly to the 1-unit bet-value terminal 203. The lead 104' from the 5-unit bet switch is connected to the sweep arm 210 of a 10-contact stepper switch 212 which controls "5" bets. The lead 105' from the 10-unit bet switch is connected to the sweep arm 220 of a 10-contact stepper switch 222 which controls "10" bets. The two sweep arms are driven by a stepper motor 230 actuated in response to each play signal Vp from conductor 36 in FIG. 7, which steps both arms 210 and 220 forward one step at the completion of each incorrect play; and by a homing motor 232 energized in response to each correct play signal Vr from the conductor 38 of FIG. 7, which returns the arms 210 and 220 to their home or first-contact positions upon the completion of a correct play. The actuation of the motors 230 and 232 is timed to occur at the completion of a play by energizing them through switches which are closed at the end of the sweep of the sweep switch 46 (FIG. 7). In some sweep switches, it is possible to isolate the unused last two contacts of layers 46c and 46d from the conconfidence point counting circuits, in which case such contacts are used to close circuits to actuate the stepper motors 230 and 232. Otherwise, an additional layer is added to the sweep switch 46 for closing such circuits at the end of its sweep.

The ten contacts 214 of the switch 212 are connected selectively to the 1-unit bet terminal 203 and to the 5-unit bet terminal 204 either directly or through two five-pole double-throw relays 240 and 250. The successive contacts 224 engaged by the 10-bet sweep arm of the switch 222 are connected selectively to the 1-unit bet terminal 203 and to the 10-unit bet terminal 205, either directly or through the relays 240 and 250.

The relays 240 and 250 may be designated left-edge an bottom-edge relays respectively. The left-edge relay 240 is actuated in response to the completion of a correct play in the left edge column of the button array; the bottom edge relay 250 is actuated in response to completion of a correct play in the bottom edge row of the array, and both are actuated when a play is completed at the bottom left corner button G–1.

The relays 240 and 250 change the connections from the stepper switch contacts 214 and 224 to the bet-signal output terminals 203, 204 and 205 in accordance with whether there are eight, or five, or three possible play positions from the last completed play, that is, in accordance with whether the last play was in the middle, at an edge, or at the corner of the button array. To this end, connections are made in the pattern shown in FIG. 9 among the stepper switch contacts 214 and 224, the poles and contacts of the upper four switches of the relays 240 and 250, and the three bet-signal output terminals 203, 204 and 205.

The positions of the relays on any play are determined by the position of the next-preceding programmed and completed correct play. Accordingly, the relays must be actuated in response to the position of the completed correct play and must remember or retain their control throughout any series of incorrect plays made before the next correct play is completed.

To this end, the relays 240 and 250 have hold switches 245 and 255 to maintain hold circuits to their coils 246 and 256, and are actuated by a relay 260 which is closed by the correct-play signal Vr from each completed correct play and which energizes the relay 240 or relay 250 or both depending on whether the completed play which caused such signal was programmed and made at the left edge, the bottom edge, or the bottom left corner of the button array.

The relay 260 is a four-pole double-throw relay having a coil 266 connected to be energized by each correct play signal Vr which appears at conductor 38 of FIG. 7. The upper two switches 261 and 262 of the relay 260 control the left-edge relay 240, and are coupled with the programming switches 271, 272 nd 273 which establish a programmed play in the left edge column of the button array. The two lower switches 263 and 264 control the bottom-edge relay 250, and are coupled with the programming switches 274, 275 and 276 which establish a programmed play in the bottom edge row of the play button array.

Consider first the lower switches 263 and 264 of the relay 260. The pole of the switch 264 and the normally closed contact of the switch 263 are connected by conductor 281 to the conductor 60 for the bottom row G of play-button switches. That conductor 60 is energized from the battery 80 whenever a play is programmed in that row G by the tape-controlled closure of switches 274, 275 and 276. The normally open contact of the switch 264 is connected by a conductor 282 to energize the coil 256 of the relay 250 when the relay 260 is closed and button row G is energized. A temporary holding circuit is provided from conductor 281 to a conductor 283 leading to the pole of the hold switch 255, which circuit is effective as long as the switches 274, 275 and 276 are in programmed position to energize button row G. A second holding circuit runs from the battery 80 through the line 280 to the pole of relay switch 263, and thence to the normally closed contact of that switch 263 and to the conductor 283, which circuit holds relay 250 closed when relay 260 is open and button row G is de-energized.

The switches 261 and 262 of relay 260 are similarly connected to control the left-edge relay 240. The pole of switch 262 is connected by a conductor 291 to the common conductor 62 for the left edge column of play button switches of the array in FIG. 7, which conductor 62 is connected to the conductor 38 at the left edge of FIGS. 7 and 9 when the uppermost switches 271 and 272 and 273 of the tape controlled relays 71, 72 and 73 are positioned to establish a correct play in that left-edge column of the play buttons. To energize the relay 240 through these connections, the conductor 38 is connected by a lead 238 to the negative side of a third power source, shown as a battery 290, the positive side of which is grounded to an independent ground 292. A temporary holding circuit is provided through the switches 271, 272 and 273 and conductor 291 to the pole of the holding switch 245. A second holding circuit runs from the battery lead 238 through the pole of the switch 261 and the normally closed contact of that switch to the conductor 291 connected to the pole of the switch 245.

Operation of the high bet mullifier of FIG. 9 is as follows:

Assume that the last completed correct play was in the middle of the board so that neither of the relays 240 or 250 is closed. The first six contacts 214 of the 5-bet stepper switch 212 will be connected either directly or through normally closed connections of the relays 240 and 250 to the 5-unit bet terminal 204. Accordingly, in a series of six incorrect plays, any actual bet of "5" will cause a bet signal to be transmitted to the 5-unit bet terminal 204, from which the signal will be handled by the circuits of FIG. 8 in the manner described for a bet of "5." However, the seventh and eighth contacts 214 of the stepper switch 212 are connected directly to the 1-unit bet terminal 203, so that bets of "5" on a seventh or eighth play of a series will produce a bet signal at the 1-unit bet terminal 203, from which it will be handled as a 1-unit bet by the circuits of FIG. 8.

The 9th and 10th contacts of the stepper switch 212 are connected to the 5-unit bet terminal 204, since more than eight incorrect plays from the same mid-board position indicates that the subject is not deducing the correct play by any process of elimination and hence that normal evaluation of his bets can be made.

In the 10-bet switch 222, the first seven contacts of the stepper switch 222 are connected either directly or through normally closed contacts to the 10-unit bet terminal 205, so that an actual bet of "10" on any of a series of seven incorrect plays will produce a bet signal at such 10-unit bet terminal 205 and through it to the circuits of FIG. 8. The eighth contact 224 of the switch 222 is connected directly to the 1-unit bet terminal 203, so that a bet of "10" on the eighth play of the series will be reduced to a value of 1 and will appear as a bet signal at the 1-unit bet terminal 203.

When the programming tape programs a correct play at the left edge or the bottom edge or the bottom-left corner of the play-button array, this will close circuits through the switches 271, 272, and 273, or the switches 274, 275, and 276, or both, from the connected power supplies 290 or 80 to the switches of the relay 260. When the programmed play is correctly completed, the resulting signal Vr will close the relay 260, and this in turn will close one or both of the relays 240 or 250. Upon such closure, a temporary holding circuit or circuits will be established to the relays 240 and 250 from the edge conductors 60 or 62, since the tape-controlled relays 71–76 will temporarily remain in their previous condition until the tape programmer is advanced. Meanwhile, the relay 260 will open when the momentary correct-play signal Vr ends, and the open relay 260 will establish a continuing holding circuit through one or both of the normally closed contacts of the switch 261 and 263, to maintain closure of the relays 240 or 250 or both. Such closed conditions will then persist until a new correct play signal actuates the relay 260 to break the existing holding circuit or circuits, by opening the normally closed contacts. Accordingly, the edge position of one completed correct play will control the conditions of the relays 240 and 250 until the next correct play is completed, and hence change the bet signal connections for such next play to apply the high bet nullifying effect to the bets on the last play or plays of a five-play or three-play series in accordance with whether the completed play is at an edge or at the corner of the button array.

If the newly completed play is itself at an edge or at the corner, the relays will be actuated in like manner to control the bets on the next following series of plays.

If a completed correct play is at the left-edge or bottom edge of bet buttons array, only five possible positions will be available for the next play, and one of the relays 240 and 250 will be closed as described above. This will change the connections from the contacts 214 and 224 of the stepper switches to the bet value terminals 203, 204 and 205. With either relay 240 or 250 closed, the first three contacts 214 of the stepper switch 212 will be connected to the 5-unit bet terminal 204, while the 4th and 5th contacts 214 will be connected to the 1-unit bet terminal 203. Accordingly, a bet of "5" on any of a series of three incorrect plays will be registered as such, while a bet of "5" on the fourth and fifth plays of the series will be reduced to "1." In like manner, the first four contacts 224 of the 10-bet stepper switch will be connected to transmit a bet of "10" as such, while the fifth will be connected to transmit a bet of "10" as a bet of "1."

If a completed correct play is in the bottom left corner button G–1, there will be only three possible positions for the next correct play. Both relays 240 and 250 will then be closed to change the connections so that on the second or third plays of three-play series, a bet of "5" will produce a signal at the 1-unit bet terminal 203, and on the third play of a three-play series, a bet of "10" will produce a signal at the 1-unit bet terminal 203. This will nullify bets of "5" or "10" on these plays of the series.

SUMMARY OF THE OPERATION

The player bets "1," "5" or "10" on the buttons 18 which close switches 100, FIG. 8, or 100′, FIG. 9. He then makes a play on the buttons 16 which close switches 64, FIG. 7. Such play is determined by the discriminator 34 to be correct or incorrect with reference to the play programmed by the tape reader 20. The plays are programmed in recognizable patterns which are repeated sufficiently to furnish the player with a basis for deducing where the next correct play is likely to be and to exhibit by each of his bets the level of confidence he has in the correctness of each of his plays.

The selected bet switch 100, or 100′, transmits a voltage signal to one of the bet value terminals 203, 204 and 205 depending upon the value of the bet and upon the condition of the high bet nullifier of FIG. 9 when it is present in the apparatus, as is preferred.

The bet signal is delivered to the score relay 44, and by it either (a) to sweep switch layer 46a if the play is incorrect or (b) to sweep switch layer 46b if the play is correct, and the sweep switch layer generates pulses to actuate the score indicator 14 to subtract or add the value of the bet to the accumulated score.

Meanwhile, in the case of an incorrect play, the bet signal is delivered by the confidence relay 52 directly to the over-confidence layer 46d of the sweep switch, which generates pulses to register over-confidence points on the counter 21. In the case of each correct play, the bet signal is delivered by the confidence relay 52 to the bet programmer 54, which determines whether the bet is the appropriate bet, an over-bet, or an under-bet, and whether over or under by one step or by two steps, and transmits the bet voltage signal over one of the leads 55a–55d accordingly.

The voltage on the lead 55 is appropriately switched by the relay module to either the under-confidence sweep switch layer 46c or the over-confidence sweep switch layer 46d, and is applied to a selected number of swept contacts of that layer depending upon the size of the over- or under-bet and upon how the module relays have been actuated by their control switches 131–135 in response to the position of the cam 130 which is advanced by certain increases in the size of the accumulated game-score total. The swept contacts to which the bet voltage is applied, when swept by a sweep arm 106, generate pulses to register under-confidence points or over-confidence points on the counters 21 and 22.

The game score and the number of under- and over-confidence points accumulated by the player in a set of games programmed on the tape reader 20, or within a certain period of time, furnish a measure of the player's judgment-making abilities.

Successive testing of the same player with game-sets of known difficulty furnishes a measure of the effects on such judgment-making abilities of drugs administered to the player.

I claim:

1. Judgment evaluating apparatus comprising a selection device on which a test subject makes successive judgment-based selections,
    program means operable to present a predetermined series of correct selections for selection on such device, in a sequence or pattern which is recognizable by the subject as he progressively makes correct selections of the series and which he may then use as a basis for judging later correct selections in the series,
    a confidence selector by which, for each judgment-based selection, the subject selects a score quantity, from a plurality of different score quantities, which indicates his level of confidence in the correctness of such judgment-based selection,
    and a game score counter means responsive to the actuation of both the selection device and the confidence selector and operable to add and subtract the score quantities of the confidence indications made on correct and incorrect selections respectively.

2. Judgment evaluating apparatus according to claim 1, with the addition of
    confidence evaluating means, including means for establishing an appropriate score quantity to be selected on said confidence selector as the appropriate confidence level for each selection,
    and confidence scoring means for registering confidence points based on a difference between the subject's selected score quantity and the appropriate score quantity so established.

3. Judgment evaluating apparatus according to claim 2, in which said confidence scoring means includes,
    a comparator operative to determine whether the subject's selected score quantity is over or under the appropriate score quantity,
    and means to separately register over-confidence and under-confidence points in response to such determination.

4. Judgment evaluating apparatus according to claim 3, in which said comparator also includes means to determine the degree by which the selected score quantity differs from the appropriate score quantity, and said register means registers different numbers of points accordingly.

5. Judgment evaluating apparatus according to claim 3, in which said means for establishing an appropriate confidence-level comprises
    a confidence-level reference device having a plurality of different appropriate level positions and normally set in a low position,
    means responsive to said program means for actuating said reference device for movement to a higher position at a predetermined stage in the program,
    and subsequently-operable means for actuating the level reference to a higher position in response to a correct selection and to a lower position in response to an incorrect selection.

6. Judgment evaluating apparatus according to claim 3 in which said means for establishing an appropriate confidence-level comprises
    a confidence-level reference device having a plurality of different appropriate level positions,
    and means for actuating the level reference to a higher position in response to a correct selection and to a lower position in response to an incorrect selection.

7. Judgment evaluating apparatus according to claim 2 with the addition of means to vary the number of confidence points registered on a correct play in response to an increase in cumulative game score.

8. Judgment evaluating apparatus according to claim 3, with the addition of means to decrease the over-confidence scores and increase the underconfidence scores registered on a correct play, in response to an increase in cumulative game score.

9. Judgment evaluating apparatus according to claim 1, with the addition of a register for registering over-confidence points,
    and means responsive to an incorrect play for actuating such register when the selected score quantity on such play is higher than a predetermined level.

10. Judgment evaluating apparatus according to claim 9, with the addition of means responsive to a correct play for preventing such incorrect-play response.

11. Judgment evaluating apparatus according to claim 10 with the further addition of means for establishing an appropriate score quantity to be selected on said confidence selector as the appropriate confidence level for each correct play, and means for actuating said over-confidence register in response to a correct play when the selected score quantity exceeds the appropriate score quantity.

12. Judgment evaluating apparatus according to claim 1, with the addition of a register for registering under-confidence points.
    means for establishing an appropriate score quantity to be selected on said confidence selector as the appropriate confidence level for each correct play,
    and means for actuating said under-confidence register in response to a correct play when the selected score quantity is below the appropriate score quantity.

13. Judgment evaluating apparatus according to claim 1 in which said selection device comprises an array of a plurality of rows and columns of play-buttons,
    and said program means operates to program a sequence of plays on said buttons forming a recognizable geometric pattern on said array.

14. Judgment evaluating apparatus according to claim 2 in which said selection device comprises an array of a plurality of rows and columns of play-buttons,
    and said program means operates to program a sequence of plays on said buttons forming a recognizable geometric pattern on said array.

15. Judgment evaluating apparatus according to claim 13 in which said program means operates in response to an interchangeable record.

16. Judgment evaluating apparatus according to claim 15 in which said record is a punched tape.

17. Judgment evaluating apparatus according to claim 13 in which said confidence selector comprises a plurality of bet-buttons operative to select different score quantities representing different-sized bets on the correctness of a play.

18. Judgment evaluating apparatus according to claim 14 in which said confidence selector comprises a plurality of bet-buttons operative to select difference score quantities representing different-sized bets on the correctness of a play.

19. Judgment evaluating apparatus according to claim 17, with the addition of play switch means actuated by said play buttons to produce a "play" voltage signal in response to each play and a separate "right" voltage signal in response to each correct play, bet switch means actuated by said bet buttons to produce different bet signals in accordance with the actual bet made by operating the bet buttons, a score pulse generator controlled by said bet switches to generate different numbers of pulses in response to the respective actual-bet signals, said game-score counter means being actuated by said pulses.

20. Judgment evaluating apparatus according to claim 19 with the addition of point pulse generating means for generating a number of confidence-point pulses, a stepper switch having a plurality of positions corresponding to different appropriate bets on a play, and means to position said switch to program an appropriate bet for each play, a confidence relay operable in response to an incorrect play to transmit the bet signals to said point pulse generator for controlling the number of pulses generated thereby, said confidence relay being operable in response to a correct play to transmit the bet signals to said stepper switch, said stepper switch being connected to transmit an over-bet signal when the actual bet is above the appropriate bet and an under-bet signal when the actual bet is below the appropriate bet, and means to transmit said under-bet and over-bet signals to control said point pulse generator, and confidence point counting means actuated by the point pulse generator.

21. Judgment evaluating apparatus according to claim 20 with the addition of a relay module controlled by said game-score counter means, to modulate the control of point pulse generator in response to said over-bet and under-bet signals.

22. Judgment evaluating apparatus according to claim 20 in which said stepper switch is connected to transmit a plurality of over-bet and under-bet signals representing different over-bet and under-bet values or steps.

23. Judgment evaluating apparatus according to claim 21 in which said stepper switch is connected to transmit a plurality of over-bet and under-bet signals representing different over-bet and under-bet values or steps.

24. A play device of the character described, comprising an array of play buttons on which the player makes individual play selections on a series of successive plays, program means operable to program a predetermined series of correct plays on the button array in a geometric pattern which is recognizable by the player as he progressively makes correct plays in the series and which he may then use as a basis for making subsequent play selections, means to indicate to the player whether each play is correct, a bet selector by which the player selects one of a plurality of different-sized bets on the correctness of each play, and game score counter means responsive to the actuation of both the play buttons and the bet selector on each play and operative to add and subtract the values of the player's selected bets on correct and incorrect plays respectively.

25. A play device as set forth in claim 24, with the addition of bet-evaluating means, including means to establish an appropriate bet for each play, and point scoring means for registering bet-evaluation points from a difference between the player's actual bet and the appropriate bet on each play.

26. A method of evaluating judgment-making abilities of a subject, which comprises establishing a pre-programmed series of actions, each being included in a number of alternative actions among which the subject makes a judgment-based selection, the series being in a pattern or sequence in which earlier correct selections provide a basis for making later correct selections, having the subject make successive judgment-based selections from among the alternatives for each action of the series, requiring the subject to indicate, for each selection he makes, which of a plurality of different score quantities represents his level of confidence in his judgment as to the correctness of such selection, advising the subject of each correct selection, keeping a game score as a sum of the score quantities he indicated as his confidence-level indications, added or subtracted according to whether each selection is correct or incorrect respectively, correlating each indicated confidence-level score quantity with a programmed appropriate confidence-level score quantity for each selection, and registering a measure of such correlation on a series of selections as a basis, taken with the game score, of evaluating the subject's judgment-making abilities.

27. Judgment evaluating apparatus according to claim 1, in which said selection device provides a predetermined limited number of possible choices for the next correct selection after a completed correct selection, and means responsive to the making of a series of a number of incorrect judgment-based selections after the completed correct selection, fewer than said limited number, and operative on one or more subsequent judgment-based selections to transmit to said game score counter means a predetermined low score quantity, less than that selected by the subject, when the subject selects a score quantity higher than such predetermined low score quantity.

28. Judgment evaluating apparatus as set forth in claim 27, in which the number of possible choices for a subsequent selection varies in accordance with the choice of the completed selection, and means to vary the length of the series of incorrect selections after which said score-reduction is effective.

29. A play device as set forth in claim 24, in which said array of buttons provides a predetermined limited number of possible positions for the next correct play after a completed correct play, and means responsive to a series of a number of incorrect plays fewer than said limited number and operative on one or more subsequent plays to transmit to said game score counter a low bet value, less than that selected by the player, when the player selects a bet value higher than such low bet value.

30. Judgment evaluating apparatus as set forth in claim 29, in which the number of possible positions for a subsequent play varies in accordance with the position of the completed play, and means to adjust the length of the series of incorrect plays after which said bet value reduction is effective.

31. Judgment evaluating apparatus as set forth in claim 29, in which said responsive means comprises a stepper switch which is stepped in response to incorrect plays and is reset in response to each correct play.

References Cited

UNITED STATES PATENTS

| | | | |
|---|---|---|---|
| 2,215,544 | 9/1940 | Condon et al. | |
| 2,826,828 | 3/1958 | Hamilton | 35—9 |
| 3,300,877 | 1/1967 | Feder | 35—9 |
| 3,350,793 | 11/1967 | Bushnell | 35—9 |
| 3,367,663 | 2/1968 | Marks. | |
| 3,384,375 | 5/1968 | Zifferblatt. | |
| 3,438,628 | 4/1969 | Becker et al. | 273—139 |

WILLIAM H. GRIEB, Primary Examiner

U.S. Cl. X.R.

35—22; 273—1